United States Patent [19]

Arima et al.

[11] Patent Number: 5,006,376
[45] Date of Patent: Apr. 9, 1991

[54] JOINT BOOT MOLDED OF A THERMOPLASTIC POLYESTER ELASTOMER

[75] Inventors: Yoshihiro Arima, Ibaraki; Soiti Otuka, Sakai; Nishida Kazushige, Suita, all of Japan

[73] Assignee: Toyo Tire and Rubber Co., Ltd., Osaka, Japan

[21] Appl. No.: 474,214

[22] Filed: Feb. 1, 1990

Related U.S. Application Data

[63] Continuation of Ser. No. 710,907, Mar. 12, 1985, abandoned.

[30] Foreign Application Priority Data

Mar. 15, 1984 [JP] Japan ................................ 59-50328

[51] Int. Cl.$^5$ .............................................. B29D 22/00
[52] U.S. Cl. ..................... 428/34.1; 428/35.1; 428/174; 428/213; 428/219; 428/480; 403/50; 403/223; 285/225; 285/235; 74/18; 74/18.1; 128/121.1; 128/125.1
[58] Field of Search ................. 428/34.1, 35.1, 174, 428/213, 219, 480; 403/50, 223; 285/225, 235; 74/18, 18.1; 128/121.1, 125.1

[56] References Cited

U.S. PATENT DOCUMENTS

| | | | |
|---|---|---|---|
| 3,033,046 | 5/1962 | Rodda | 74/18.1 |
| 3,700,297 | 10/1972 | Fickenwirth et al. | 74/18.1 |
| 4,424,834 | 1/1984 | Sumi et al. | 428/36 |
| 4,522,081 | 6/1985 | Mackin et al. | 74/18.1 |

Primary Examiner—Patrick J. Ryan
Attorney, Agent, or Firm—Koda and Androlia

[57] ABSTRACT

A molded joint boot obtained by using a highly hard and highly elastic thermoplastic polyester elastomer as the molding material. The molded boot is formed into the shape of a conical bellows having a major-diameter portion connected to a minor-diameter portion by a tapered wave-like portion. Along the direction from the major-diameter portion to the minor-diameter portion, the ratio of the outside diameter of the crest portion on the minor-diameter side of a given wave to the outside diameter of the immediately-preceding trough portion of the same wave is confined within the range of about 1.08 to about 1.40. The subject molded boot is processed by injection molding, and the thermoplastic polyester elastomer employed as the molding material is above about 70 kg/cm$^2$ in tensile yield strength, above about 30% in tensile yield elongation, and within the range of about 430 kg/cm$^2$ to about 1700 kg/cm$^2$ in tensile elasticity modulus. The molded boot thus obtained is of longer service life without experiencing deformational anomalies, such as buckling, even when subjected to pronounced bending during operational use.

1 Claim, 1 Drawing Sheet

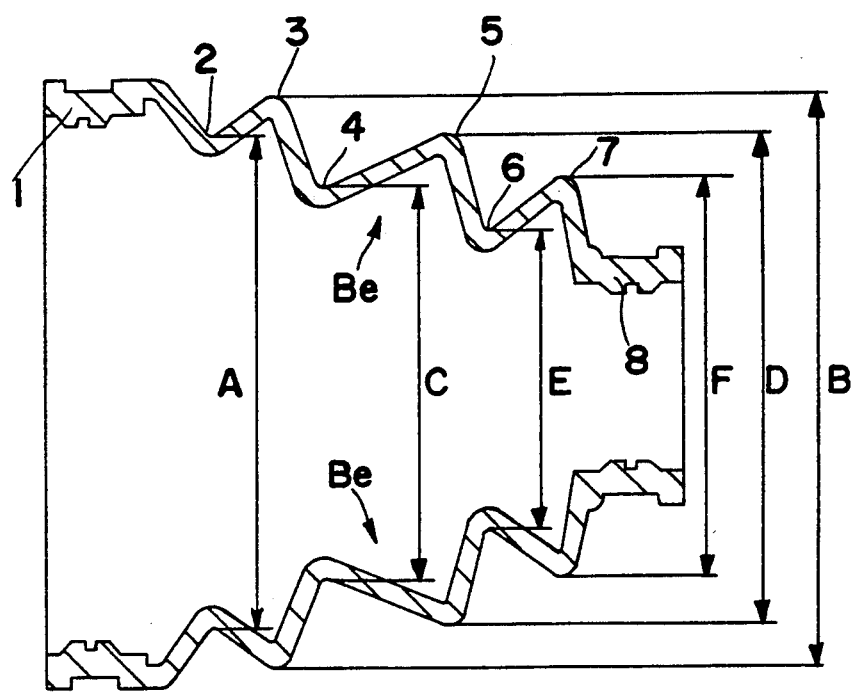

JOINT BOOT MOLDED OF A THERMOPLASTIC POLYESTER ELASTOMER

This is a continuation of application Ser. No. 710,907, filed Mar. 12, 1985, now abandoned.

BACKGROUND OF THE INVENTION

1. Field of the Invention

The present invention relates in general to a molded joint boot obtained by using a thermoplastic polyester elastomer (TPE) as the molding material and relates in particular to a molded joint boot which is both formed into a bellows-like shape by using a TPE molding material having a high modulus of elasticity, and which is ideally suited to uses such as an enclosure boot for the universal joints in the transaxle of a front-wheel-drive automobile.

2. Description of the Prior Art

Several processes have conventionally been employed for obtaining bellows-like moldings in which the component material is formed into a pattern resembling a series of waves with an associated repeated sequence of crests and troughs. Such processes have included two types of blow molding, distinguishable in part by the manner in which the cylindrical parison workpiece is obtained. The first blow-molding process operates with respect to a screw-extruded parison, while the second utilizes a parison which is itself injection molded. The provided parisons are then blow-inflated within a metal mold of specified form, the parisons being sufficiently thick to suitably withstand the mold-conformance stretchings inherent in the inflation process.

The bellows-like moldings obtained through such blow-molding processes are nevertheless very thin, with usual thickness of about 0.7 to about 1.8 mm. It has consequentially been considered difficult to employ the referenced TPE's for the formation of such moldings through the use of injection-molding processes alone. Thus widely utilized instead has been the above-mentioned blow-molding process in which injection molding is employed only intermediately to produce the parison workpiece.

With evaluative regard to the two subject blow-molding processes, the extruded-parison process is deficient in that even if suitable means are employed to controllably vary the thickness of the produced parison, stretch-induced irregularities in the comparative thicknesses of the crest and trough portions within bellows-like moldings still result. Techniques for overcoming this deficiency have not as yet been presented. With regard furthermore to the injected-parison process, it is similarly quite difficult to obtain uniform thicknesses, thereby disadvantageously giving rise during use to such deformational anomolies as buckling. In addition, neither the extruded-parison nor the injected-parison processes have typically been suseptable to improvements in dimensional accuracies for the interior diameters of the final molded products. In view of these disadvantages, it would be very desirable to be able to alternatively employ a totally injection-molded process, with its superior dimensional-tolerance capabilities.

However, just as it has previously been regarded as being very difficult to employ the referenced TPE's as thin-wall molding materials in totally injection-molded processes, so also have there been few other injectably-appropriate materials with the requisite optimum degree of fluidity needed to achieve very-thin final-product wall thicknesses of about 0.7 to about 1.8 mm.

Furthermore, because conventional embodiments of the subject bellows have typically been formed of materials which are relatively soft, the centrifugal forces generated during high-speed rotational use have caused the associated wall members to become greatly extended, thereby coming into contact with surrounding parts where frictional wear then occurs. Moreover, because the innate structural strength of the subject moldings is relatively low, there is a resultant tendency toward breakage after only a short period of use, due to material fatigue as accelerated by repeated expansion and contraction.

SUMMARY OF THE INVENTION

With the foregoing shortcomings of the prior art in mind, it is an object of the present invention to provide a TPE joint boot which can be molded by means of a completely-injective process, and which facilitates mold releaseability. The production of satisfactory moldings on a consistent basis may thereby be achieved.

It is another object of the present invention to provided a TPE-molded joint boot which withstands long periods of use without experiencing deformational anomolies such as buckling.

In accordance with the principles of the present invention, these objects are achieved by a unique, molded-TPE joint boot which possesses both a high degree of hardness and a high modulus of elasticity. The hardness is above about 70 kg/cm$^2$ in tensile yield strength and above about 30% in tensile yield elongation. The tensile elastic modulus is in the range from about 430 kg/cm$^2$ to about 1700 kg/cm$^2$. With regard furthermore to a tapered bellows-like specific embodiment of this molded boot, the bellows structure is designed such that in the direction from the bellows' major-diameter portion to its minor-diameter portion, the ratio between the outside diameters of a given crest and the immediately-preceding trough is confined to within the range of about 1.08 to about 1.40. (That is, as between a neighboring crest and trough, mutually disposed with the crest on the minor-diameter side of the given wave and the trough on the major-diameter side of the wave, the ratio of the respective diameters is constrained to be within the indicated 1.08–1.40 range.)

BRIEF DESCRIPTION OF THE DRAWINGS

The FIGURE is a sectional view showing, as an embodiment of the present invention, a joint boot molded of thermoplastic polyester elastomer.

DETAILED DESCRIPTION OF THE INVENTION

When a material with high hardness as well as a high modulus of elasticity is to be employed for the subject injection molding, it is necessary to specify those appropriate conditions of material quality and product shape which will ensure both satisfactory mold releasability and output-product consistency. The shape of the bellows is accordingly a particularly important consideration for the present invention.

At the same time, however, material-quality factors which must also be considered are the expansion forces and high tensile forces required to assure mold releasability after product formation. This is especially so given that the joint boot provided by the present invention utilizes a material with high hardness as well as a high modulus of elasticity.

In general, therefore, mold release must necessarily be performed within the material's elasticity limit so that permanent deformation is avoided. From a material-selection standpoint, the employed thermoplastic polyester elastomer (TPE) must accordingly possess both a high tensile yield strength (the strength at the yielding point in kg/cm$^2$) and a high tensile yield elongation (the extensibility % at the yielding point, with the subject co-referenced yielding point being that at which permanent deformation begins to occur, and with the measurement of such yielding points being performed in accordance with ASTM D638). The more-specifically stated releasability criterion is thus that the mold-releasing operation must be arranged so as to be carried out within the material's tensile yield strength and tensile yield elongation.

The material accordingly preferred for the present invention is a highly-elastic TPE with the following characteristics:

(a) tensile elasticity modulus from above about 430 kg/cm$^2$ up to about 1700 kg/cm$^2$ (with the subject modulus being indicative of the TPE's hardness, within the range of about 85 degrees C. to about 99 degrees C., as measured by the JIS Spring-Type Hardness Meter Model A);

(b) tensile yield strength above about 70 kg/cm$^2$; and (c) tensile yield elongation above about 30%.

As previously noted, an appropriately-designed shape for the subject bellows is an important consideration conjunctive to material selection in enabling various inventive goals to be achieved. Thus proper design is of co-requisite importance to the injection-molding use of a TPE which both satisfies the foregoing specifications and which possesses satisfactory mold-release characteristics. Moreover, proper design is likewise co-requisitely important to consistently obtaining end products which will remain free from deformational anomalies, such as buckling, brought about by deformation-inducing angular extensions experienced during operational use.

The following-described structure for the subject bellows is a discovery which resulted from studies conducted with the foregoing considerations in mind. In general, the subject structure is a conical bellows comprised of a tapered wave-like portion connectively interposed between a major-diameter portion and a minor-diameter portion. More-specifically, in the context of the direction from the major-diameter side to the minor-diameter side, the structure as molded is configured such that the ratio of the respective outside diameters of the crest on the minor-diameter side of a given wave and of the neighboring trough on the major-diameter side of the wave is constrained to be within the range of about 1.08 to about 1.40. When the structure is configured in accordance with these stipulations, there may be obtained as desired a molded joint boot which will remain free from deformational anomalies, such as buckling, brought about by the pronounced joint bending frequently encountered during even ordinary operational use.

When the above-mentioned diameter ratio is below about 1.08, the total length of the inclined portions of the bellows becomes extremely short. Accordingly, when in the example context of a front-wheel-drive automobile transaxel the joint between the drive shaft and the wheel axel is bent sharply to a point where the joint angle exceeds about 20 degrees, the portion of the bellows wall disposed exterior to the bent joint becomes extended almost to the point of flatness and the sleeve material itself becomes stretched a great deal. As a result, the sleeve tends to become broken after only a short operational interval.

A conceivable approach to eliminating the foregoing problem is to increase the total length of the subject inclined portions. In this case, however, the relative depth of the trough portions of the subject waves is increased. When the subject diameter ratio exceeds about 1.40, mold release following formation becomes extremely difficult due to the material's high modulus of elasticity. In addition, subsequent to mold release the dimensions of the product become irregularly elongated. Furthermore, the shape of the compressed wall portion on the inner side of the joint when bent also becomes irregular, which in turn causes the life of the sleeve to be shortened. The specifically preferable range for the diameter ratio is within the interval from about 1.15 to about 1.35.

The invention will now be further described with reference to the illustrated embodiment. The FIGURE shows a joint boot which embodies the present invention. In the FIGURE, the numeral 1 designates a major-diameter portion, "Be" denotes a bellows-like portion and the numeral 8 designates a minor-diameter portion. Within this bellows-like structure, proceeding from the major-diameter portion 1 to the minor-diameter portion 8, numeral 2 denotes a trough portion, numeral 3 denotes a neighboring crest portion, numeral 4 denotes a trough portion, numeral 5 denotes a crest portion neighboring the foregoing trough portion 4, numeral 6 denotes a trough portion, numeral 7 denotes a crest portion likewise neighboring the preceeding trough portion 6, and numeral 8 again denotes the minor-diameter portion. The outside diameter of trough portion 2 is indicated by the letter A, the outside diameter of crest portion 3 is indicated by the letter B, the outside diameter of trough portion 4 is represented by the letter C, the outside diameter of crest portion 5 is denoted by the letter D, the outside diameter of trough portion 6 is represented by the letter E, and the outside diameter of crest portion 7 is designated by the letter F.

Presented next will be the results of tests conducted for comparative evaluation of various embodiments. The comparison testing was carried out using an injection-molding machine manufactured by Nissei Jushi. The conditions established for the injection molding were 210 degrees C. for the nozzle temperature, 205 degrees C. for the front portion of the heating cylinder, 195 degrees C. for the cylinder's middle portion, 185 degrees C. for the rear portion, 78 RPM for the rotational frequency of the screw, 1100 kg/cm$^2$ for the injection pressure, 5 seconds for the injection time, 10 seconds for the cooling time, and 40 degrees C. for the metal mold temperature. The material employed as the thermoplastic polyester elastomer (TPE) was Perpuren P40H from Toyobo Co., Ltd.

The actual test results obtained with respect to variously-structured bellows are summarized in the context of the following Table:

TEST RESULTS

| Items | Sample No. 1 | Sample No. 2 | Sample No. 3 | Sample No. 4 |
| --- | --- | --- | --- | --- |
| A (Trough) | 84 | 75 | 68 | 60 |
| B/A (Ratio) | 1.04 | 1.16 | 1.28 | 1.45 |
| B (Crest) | 87 | 87 | 87 | 87 |
| C (Trough) | 72 | 60 | 56 | 51 |
| D/C (Ratio) | 1.04 | 1.25 | 1.34 | 1.47 |
| D (Crest) | 75 | 75 | 75 | 75 |
| E (Trough) | 57 | 50 | 45 | 42 |
| F/E (Ratio) | 1.05 | 1.20 | 1.33 | 1.43 |
| F (Crest) | 60 | 60 | 60 | 60 |
| Range of diameter ratio (Crest/Trough) | 1.04~1.05 | 1.16~1.25 | 1.28~1.34 | 1.48~1.47 |
| Findings | Note I | Note II | Note III | Note IV |

TABLE NOTES

Note I: Mold release was achieved satisfactorily. With regard to deformation after operational assembly, permanent elongation within the trough portions occurred at bending angles of about 10 to about 15 degrees, while buckling resulted when the angles exceeded this range.

Note II: Mold release was achieved satisfactorily. As to deformation after operational assembly, no deformational anomolies, such as buckling, resulted for the bending angles experienced during actual use.

Note III: Same mold-release and deformation results as in Note II.

Note IV: Mold release was always accompanied by permanent elongation in the trough portions.

The following observations should be readily apparent from the test results presented above: With mold formation performed utilizing the subject TPE, and for the situation in which the subject diameter ratio is less than about 1.05, post-assembly deformation occurs with bending angles of about 15 degrees, thus rendering the obtained product inadequate for actual operational use. A diameter ratio in excess of about 1.08 is thus necessary. Conversely, when the diameter ratio exceeds about 1.40, deformational irregularities are experienced. The conclusion accordingly drawn from the above is that by providing the subject bellows with a structure having a subject diameter ratio within the range from about 1.08 to about 1.40, joint boots with the subject desired characteristics can be obtained on a consistent basis.

What is claimed is:

1. An injection molded joint boot, molded of a thermoplastic polyester elastomer shaped into a conical bellows having a major-diameter portion connected to a minor-diameter portion by a tapered wave-like portion in turn having a plurality of crests and troughs, this boot characterized in that:

along the direction from the major-diameter side to the minor-diameter side, the ratio of the outside diameter of the crest portion on the minor-diameter side of a given wave to the outside diameter of the immediately preceding trough portion of the same wave is confined within the range of 1.08 to about 1.40 when mold-forming said boot as a molding product;

a tensile yield strength of the thermoplatsic polyester elastomer is about 70 kg/cm$^2$;

a tensile yield strength of the thermoplastic polyester elastomer is above about 30%;

a tensile elasticity modulus of the thermoplastic polyester elastomer is in the range of about 430 kg/cm$^2$ to about 1700 kg/cm$^2$; and a wall thickness of said boot is from 0.7 to 1.8 mm.

* * * * *

UNITED STATES PATENT AND TRADEMARK OFFICE
CERTIFICATE OF CORRECTION

PATENT NO. : 5,006,376

DATED : April 9, 1991

INVENTOR(S) : Yoshihiro Arima, et al

It is certified that error appears in the above-identified patent and that said Letters Patent is hereby corrected as shown below:

Col. 6, claim 1, line 17, change "strength" to --elongation--

Signed and Sealed this

Twenty-second Day of December, 1992

Attest:

DOUGLAS B. COMER

Attesting Officer

Acting Commissioner of Patents and Trademarks